United States Patent [19]
Mitchell et al.

[11] Patent Number: 5,650,776
[45] Date of Patent: Jul. 22, 1997

[54] COMMUNICATION RECEIVER HAVING USER CONFIGURATION CONTROL FUNCTIONS

[75] Inventors: John Francis Mitchell, Palatine, Ill.; Thomas Francis Holmes, Boynton Beach, Fla.

[73] Assignee: Motorola, Inc., Schaumburg, Ill.

[21] Appl. No.: 437,242

[22] Filed: May 8, 1995

Related U.S. Application Data

[63] Continuation of Ser. No. 125,263, Sep. 23, 1993, abandoned.
[51] Int. Cl.$^6$ .................................................. H04Q 7/18
[52] U.S. Cl. .......................... 340/825.44; 340/825.22; 340/311.1; 455/230; 364/709.14
[58] Field of Search .................. 340/825.22, 825.44, 340/311.1, 825.56; 455/38.1, 38.4, 230; 341/23; 364/709.14

[56] References Cited

U.S. PATENT DOCUMENTS

| | | |
|---|---|---|
| 4,754,423 | 6/1988 | Rollins . |
| 4,786,902 | 11/1988 | Davis et al. . |
| 4,910,510 | 3/1990 | Davis et al. ............... 340/825.44 |
| 4,951,039 | 8/1990 | Schwendeman et al. . |
| 5,182,553 | 1/1993 | Kung ........................ 340/825.44 |

OTHER PUBLICATIONS

IBM Technical Disclosure Bulletin; vol. 28; No. 4; Sep. 1985.

IBM Technical Disclosure Bulletin; vol. 28; No. 6; Nov. 1985.

*Primary Examiner*—Michael Horabik
*Assistant Examiner*—William H. Wilson, Jr.
*Attorney, Agent, or Firm*—Philip P. Macnak

[57] ABSTRACT

A communication receiver (100) includes a controller (206) providing control of at least first and second receiver operating states in response to corresponding first and second operations of at least one control (108, 110 or 112) by a user. A memory (216) stores a first control function table (308) defining an order by which a set of predetermined control functions is executed to control the first and second receiver operating states. A reconfiguration circuit (218), coupled to the memory (216) and to the at least one control (108, 110 or 112), enables the user to manually reconfigure the order by which a portion of the set of predetermined control functions is executed to control one or more different receiver operating states. The order by which the portion of the set of predetermined control functions is executed is stored within a second control function table (304) in the memory (216), and the controller (206) is responsive to the second control function table when stored.

25 Claims, 9 Drawing Sheets

FIG. 4

| | OFF | POWER UP | STANDBY | PAGE ALERT | MEMORY READ |
|---|---|---|---|---|---|
| SINGLE PUSH 3 | LIGHT ON/OFF | STANDBY | LIGHT ON/OFF | STANDBY | LIGHT ON/OFF |
| SINGLE PUSH 2 | NULL | STANDBY | MENU SELECTION | STANDBY | LOCK/UNLOCK |
| SINGLE PUSH 1 | POWER UP | STANDBY | MEMORY READ | STANDBY | MEMORY READ |
| OPTION ROUTINES | LIGHT | NULL | LIGHT | NULL | LIGHT |
| MEMORY ROUTINES | NULL | NULL | NULL | STORE PAGE | READ NEXT MESSAGE |
| DISPLAY ROUTINES | TIME DISPLAY | DISPLAY SEGMENTS | TIME DISPLAY | DISPLAY PAGE | DISPLAY MESSAGE |
| ALERT ROUTINES | NULL | POWER UP ALERT | NULL | PAGE ALERT | NULL |
| STATE TIME | INFINITY | 2 SECOND | INFINITY | 8 SECOND | 12 SECOND |
| STATE TIMEOUT | NULL | STANDBY | NULL | STANDBY | STANDBY |
| PAGE DETECT | NULL | NULL | PAGE ALERT | NULL | PAGE ALERT |

| | | | | |
|---|---|---|---|---|
| PUSH/HOLD 3 | | | | |
| PUSH/HOLD 2 | | | | |
| PUSH/HOLD 1 | | | | |
| DOUBLE PUSH 3 | | | | |
| DOUBLE PUSH 2 | | | | |
| DOUBLE PUSH 1 | | | | |
| SINGLE PUSH 3 | PERFORM OPTION | PERFORM OPTION | PERFORM OPTION | PERFORM OPTION |
| SINGLE PUSH 2 | PAGER OFF | CLEAR | SET TIME | STANDBY |
| SINGLE PUSH 1 | STANDBY | STANDBY | STANDBY | STANDBY |
| OPTION ROUTINES | MODE CHANGE | PAGER OFF | MESSAGES ERASED | SET TIME |
| MEMORY ROUTINES | NULL | NULL | NULL | STORE PAGE |
| DISPLAY ROUTINES | TIME DISPLAY | DISPLAY SEGMENTS | TIME DISPLAY | DISPLAY PAGE |
| ALERT ROUTINES | NULL | POWER UP ALERT | NULL | PAGE ALERT |
| STATE TIME | 12 SECOND | 12 SECOND | 12 SECOND | 12 SECOND |
| STATE TIMEOUT | STANDBY | STANDBY | STANDBY | STANDBY |
| PAGE DETECT | PAGE ALERT | PAGE ALERT | PAGE ALERT | PAGE ALERT |
| | MODE CHANGE | PAGER OFF | CLEAR MESSAGES | SET TIME |

FIG. 5

COMMUNICATION RECEIVER HAVING USER CONFIGURATION CONTROL FUNCTIONS

This is a continuation of application Ser. No. 08/125,263 filed Sep. 23, 1993 now abandoned.

BACKGROUND OF THE INVENTION

1. Field of the Invention

The present invention relates generally to the field of communication receivers, and more particularly to a communication receiver having user configurable control functions.

2. Description of the Prior Art

Communication receivers, such as paging receivers, have been evolving as the technology has advanced, thereby to provide the communication receiver user not only basic receiver control, but also an ever increasing number of features and options which, while previously uneconomical, are now economically available. As a result, the communication receiver user is provided not only with basic receiver operational control, but with added performance and versatility due to the increased number of features and options which are now available. At the same time, advances in technology have also enabled the size of the communication receivers to be reduced substantially. Such size reductions have placed considerable strains on the number of controls which can be provided to accommodate user control of basic receiver operations, as well as control of the added features and options.

Prior art communication receivers generally have a fixed number of controls, or switches, having predefined functions for providing basic control of the communication receiver as well as selection of features and options. Such prior art communication receivers, as a result, were often considered user-unfriendly, because configuration of the basic receiver functions, features, and options was not intuitively obvious to the communication receiver user. Other approaches were taken within the prior art communication receivers to provide a more user-friendly operation. Among these approaches were the use of fixed indicia defining a primary set of receiver control functions, and non fixed indicia displayed adjacent the receiver controls which defined a secondary set of receiver control functions. Other approaches including displayed menus which when scrolled through by the communication receiver user, provided a predefined set of receiver control functions. "Soft key" menus were also provided which enabled redefining the receiver controls for a predetermined period of time through the use of displayed indicia as a function of receiver operating states, such as to provide receiver control functions in one instance and time control functions in another. Such "soft key" menus were also available as being predefined through the use of over-the-air programming, thereby adding increased function and versatility to the communication receiver at the time a message was received. These prior art approaches, while greatly improving the communication receiver user's ability to select and control, generally did so without the communication receiver user's personal input.

As described above, while numerous approaches to defining receiver control functions have been suggested for prior art communication receivers, such approaches did not allow the user to personally select which controls would be utilized to control basic receiver functions, or which controls would be utilized to select and control available features and options. Therefore, what is needed is a communication receiver that provides user configurable receiver control functions, thereby allowing the user to select operational sequences for controlling the communication receiver which are considered by the user as user-friendly, and which, because such control functions are defined by the communication receiver user, are therefor considered more intuitively obvious to the user.

SUMMARY OF THE INVENTION

In accordance with a first aspect of the present invention, a communication receiver for receiving messages includes at least one control, a controller, a memory and a reconfiguration means. The controller provides control of at least first and second operating states of the communication receiver in response to a corresponding at least first and second operation of the at least one control by a user. The memory stores a first control function table defining an order by which a set of predetermined control functions is executed by the controller to control the at least first and second operating states of the communication receiver. The reconfiguration means is coupled to the memory and to the at least one control, and enables the user to manually reconfigure the order by which at least a portion of the set of predetermined control functions is executed by the controller in response to the corresponding at least first and second operations of the at least one control by the user to enable control of one or more different operating states of the communication receiver. The order by which the at least a portion of the set of predetermined control functions is executed by the controller is stored in the memory within a second control function table, wherein the controller is responsive to the second control function table when stored to provide control of the one or more different operating states of the communication receiver by the user.

In accordance with a second aspect of the present invention, a communication receiver for receiving messages includes a plurality of controls, a controller, a first memory and a second memory. One or more of the plurality of controls each enable a user to control different first and second operating states of the communication receiver. The controller provides control of the different first and second operating states of the communication receiver in response to corresponding first and second operations of each of the one or more of the plurality of controls. The first memory stores a first information table defining a first order by which a set of predetermined control functions is executed by the controller to control the different first and second operating states of the communication receiver. The second memory stores a second information table defining a second order by which a set of predetermined control functions is executed by the controller to control different first and second operating states of the communication receiver. The second order by which the set of predetermined control functions is executed by the controller is defined and manually reconfigurable by the user by using one or more of the plurality of controls, wherein the controller is responsive to the second information table to provide control of the different first and second operating states of the communication receiver in response to the corresponding first and second operations of each of the one or more of the plurality of controls when the second information table is stored.

In accordance with a third aspect of the present invention, a communication receiver for receiving messages includes a plurality of controls, a controller, a first memory and a second memory. One or more of the plurality of controls each enabling a user to control different first and second operating states of the communication receiver. A controller provides control of the different first and second operating states of the communication receiver in response to corresponding first and second operations of each of the one or more of the plurality of controls. The first memory stores a first information table defining a first order by which a set of predetermined control functions is executed by the controller to control the different first and second operating states of the communication receiver. The second memory stores a second information table defining a second order by which a set of predetermined control functions is executed by the controller to control different first and second operating states of the communication receiver. The second order by which the set of predetermined control functions is executed by the controller is defined and manually reconfigurable by the user by using one or more of the plurality of controls. The second memory further stores designating information designating when the second information table is reconfigured by the user, wherein the controller is responsive to the designating information to provide control of the different first and second operating states of the communication receiver in accordance with the second information table.

In accordance with a fourth aspect of the present invention, a communication receiver for receiving messages includes a plurality of controls, a controller, a first memory, a second memory, a memory, and a third memory. One or more of the plurality of controls each enabling a user to control different first and second operating states of the communication receiver. The controller is responsive to receiver control information to provide control of the different first and second operating states of the communication receiver in response to corresponding first and second operations of each of the one or more of the plurality of controls. The first memory stores a first information table defining a first order by which a set of predetermined control functions is executed by the controller. The second memory stores a second information table defining a second order by which a set of predetermined control functions is executed by the controller to control different first and second operating states of the communication receiver. The second order by which the set of predetermined control functions is executed by the controller is defined and manually reconfigurable by the user by using one or more of the plurality of controls. The memory which stores designating information designating when the second information table is manually reconfigured by the user. The third memory stores receiver control information which is executed by the controller to control the different first and second operating states of the communication receiver, wherein the controller controls storing the first information table as the receiver control information within the third memory when the designating information is not stored, and further controls storing the second information table as the receiver control information within the third memory when the designating information is stored.

BRIEF DESCRIPTION OF THE DRAWINGS

FIGS. 4 and 5 illustrate a state table depicting representative control function operation for the communication receiver which provides user configurable control functions in accordance with the preferred embodiment of the present invention.

DESCRIPTION OF THE PREFERRED EMBODIMENTS

Figure 1:
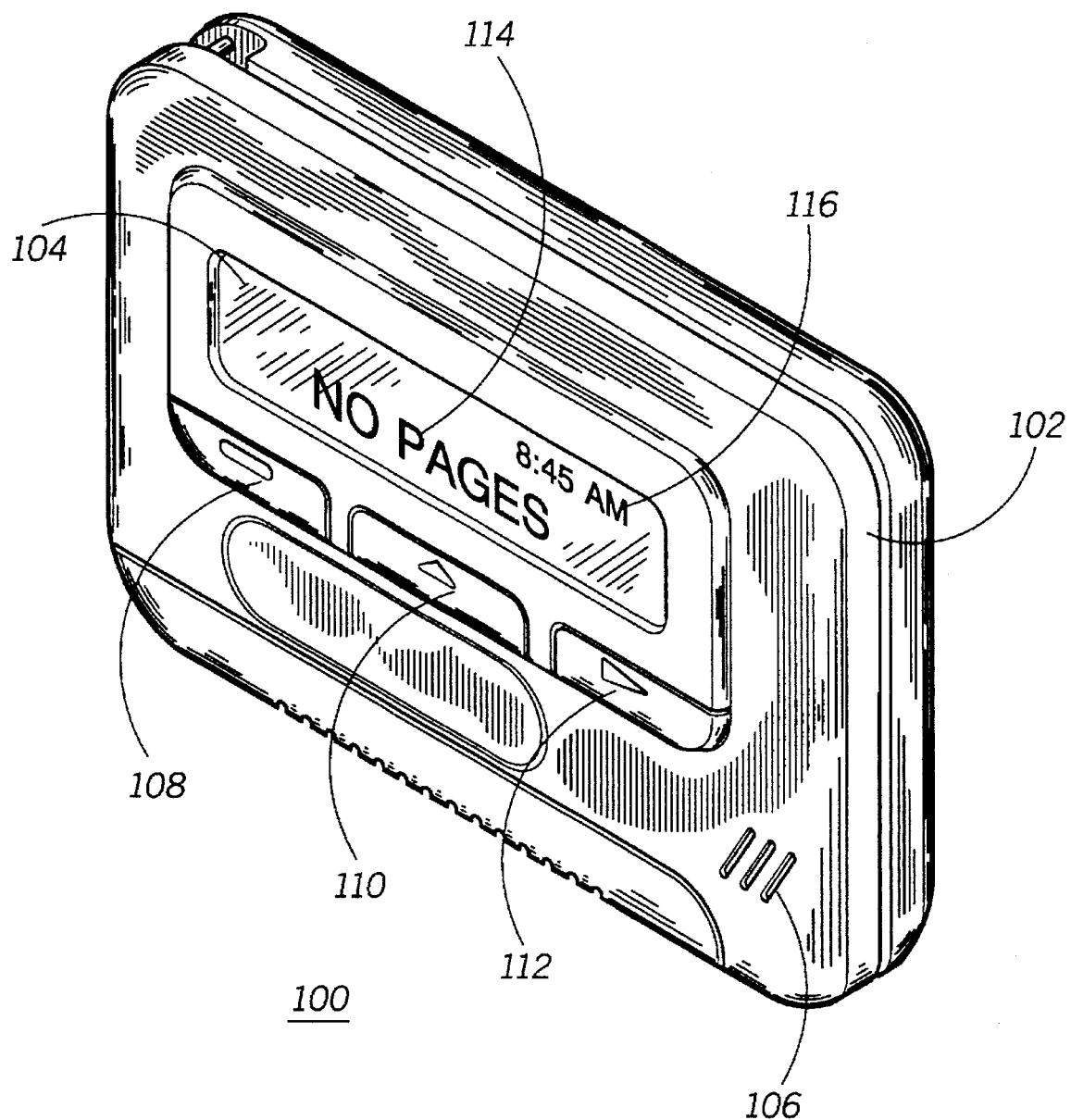
FIG. 1 is an isometric view of a communication receiver which provides user configurable control functions in accordance with the preferred embodiment of the present invention.

Referring to the figures, FIG. 1 is an isometric view of a communication receiver 100 which provides user configurable control functions in accordance with the preferred embodiment of the present invention. The communication receiver 100 is enclosed in a housing 102 which encloses the functional elements of the communication receiver 100. The communication receiver 100, shown in FIG. 1, provides a display 104 which is used to display message status information or received messages 114. The received messages can include either numeric or alphanumeric information. In addition, the display 104 can be utilized to display time 116, such as when a real time clock function is provided within the communication receiver 100. The communication receiver user, hereafter referred to as the user, is alerted to the reception of a message using a sensible alerting device, such as a vibrator, or an audible alerting device, such as a transducer which is directed through a port 106 in the housing 102. Various controls, such as buttons, or switches 108, 110 and 112 are provided to control the operation of the communication receiver 100. Because more than one function can be associated with any given switch, the switches are not generally identified by names, but rather by symbolic labels as shown. In addition, the same set of switches used to control the communication receiver functions can also be used to control other non-receiver related functions, such as for setting the time, date, or an alarm, depending upon which clock functions are provided. While three switches 108; 110, and 112 are shown, it will be appreciated that the number of controls provided can be more or less depending, among other things, on the number of receiver control functions, including those required for features and options which are provided within the communication receiver 100.

The function of the various controls 108, 110 and 112 are predefined in prior art communication receivers, such as switch 108 might be used to turn the communication receiver on and off, switch 110 might be used to read a message, or to freeze a message being read on the display, and switch 112 might be used to reset the alert signal or to clear a message while the message is being read. Use of the switches to control the communication receiver operation, as a result, generally required the user to read and memorize a users manual which defined the operation of the controls. In many instances, the control operation was not intuitively obvious, and consequently, the user often depressed the wrong switch, thereby selecting a function other than desired by the user, and in some instances selection of certain features was often so confusing, that selection of the function was avoided by the user.

The function of the various switches 108, 110 and 112 in the preferred embodiment of the present invention can be more or less permanently redefined by the user, thereby allowing the user the opportunity to select which switches are to be used to control which functions, as will be described in further detail below.

Figure 2:
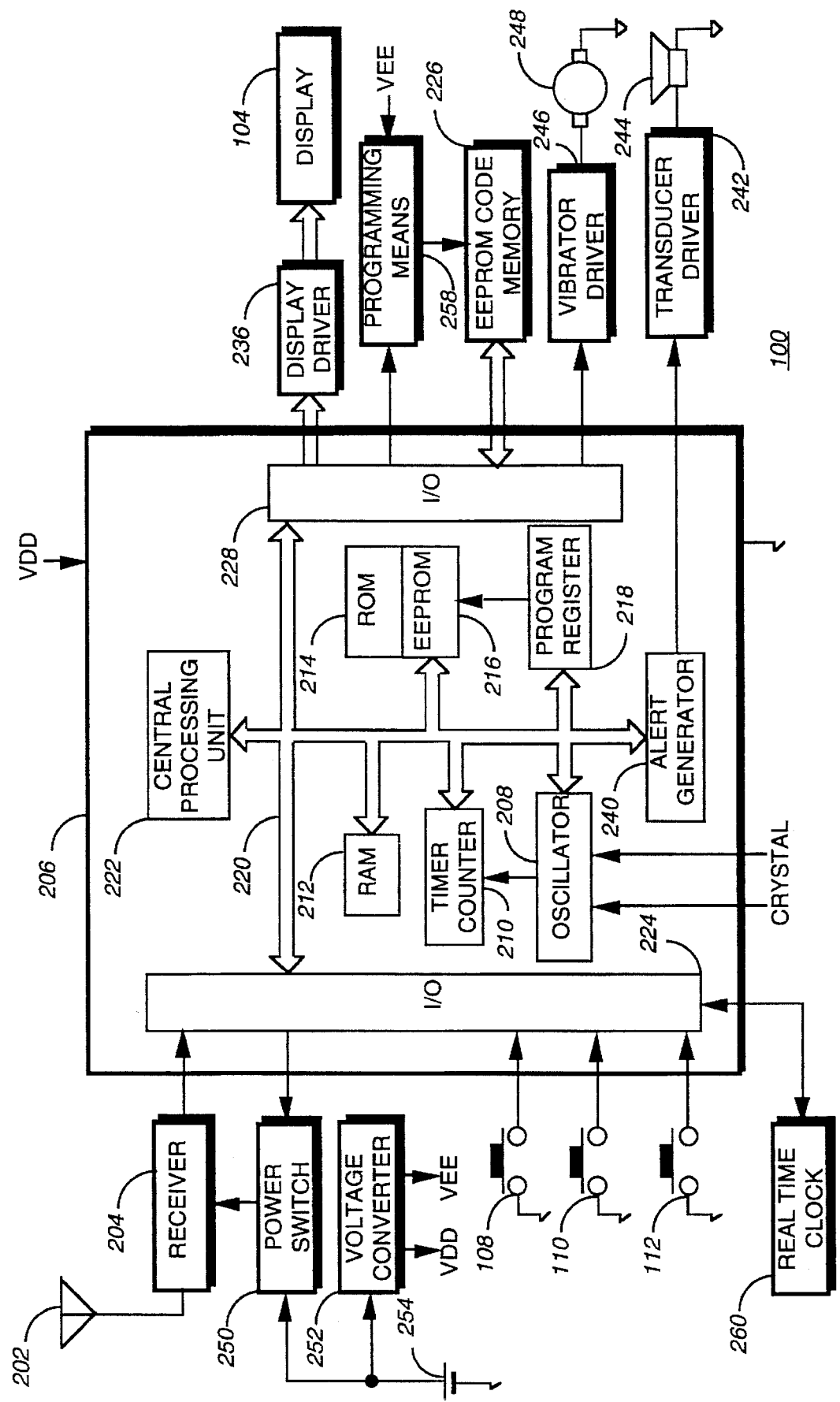
FIG. 2 is an electrical block diagram of the communication receiver providing user configurable control functions in accordance with the preferred embodiment of the present invention.

FIG. 2 is an electrical block diagram of the communication receiver 100 providing user configurable control functions in accordance with the preferred embodiment of the present invention. For purposes of description, it will be assumed that one of the well known paging signaling protocols, such as the Golay Sequential Code (GSC) signaling protocol or the POCSAG (Post Office Code Standardization Advisory Group) signaling protocol, are utilized to deliver either voice, tone only, numeric or alphanumeric messages to the communication receiver. When a signaling protocol, such as the POCSAG signaling protocol is used to encode a message, such as a numeric or alphanumeric message, the message is encoded together with an address identifying the communication receiver to which the message is directed, and then transmitted. The transmitted message is intercepted by an antenna 202 which couples the message to the input of a receiver 204. The receiver 204 processes the message in a manner well known to one of ordinary skill in the art to recover the address and message information. The recovered message information is provided at the output of the receiver 204 as a stream of digital information which is then coupled to the input of a decoder, such as a dedicated hardware decoder, or to a decoder/controller which is microcomputer based. A microcomputer based decoder is shown in FIG. 2 for purposes of description, and is implemented preferably using a microcomputer 206, such as an MC68HC705C8 microcomputer manufactured by Motorola, Inc. of Schaumburg, Ill.

The microcomputer based decoder/controller 206 includes an oscillator 208 which generates the timing signals utilized in the operation of the microcomputer. A crystal, or crystal oscillator (not shown) is coupled to the inputs of the oscillator 208 to provide a reference signal for establishing the microcomputer timing. A timer/counter 210 couples to the oscillator 208 and provides programmable timing functions which are utilized in controlling the operation of the receiver. A RAM (random access memory) 212 is utilized to store variables derived during recovered signal processing, as well as to store information necessary to control the storage of the received message information. A ROM (read only memory) 214 stores at least a part of the receiver control routines which control the operation of the communication receiver, as will be described in further detail below. An EEPROM (electrically erasable programmable read only memory) 216 is used to store additional receiver control routines, in particular those which can be reconfigured by the user, as will be described below. A program register 218 enables the contents of the EEPROM 216 to be selectively reprogrammed, thereby allowing the additional receiver control functions to be changed. The oscillator 208, timer/counter 210, RAM 212, ROM 214, EEPROM 216 and program register 218 couple through the address/data/control bus 220 to a central processing unit (CPU) 222 which executes instructions and controls the operations of the microcomputer 206.

The recovered address and message information is coupled from the output of the receiver 204 into the microcomputer 206 through an input/output (I/O) bus 224. The address information is processed by the CPU 222, and, when the received address is the same as an address stored in a code memory 226 which couples into the microcomputer 206 through I/O bus 228, the message information, if any, is received, demodulated and stored in RAM 212. At the time an address is received, an alert enable signal is generated which can be routed through the data bus 220 to an alert generator 240 that generates an alert signal which is coupled to a transducer driver 242 that processes the alert signal to enable driving an audible alerting device, such as transducer 244. In response to user selection of one of the switches 108, 110 or 112, the microcomputer 206 can also generate a tactile alert enable signal which is coupled through data bus 220 and I/O port 228 to a vibrator driver 246 that drives a vibrator 248 to enable generation of a tactile, or more commonly, a silent alert. Recovery of the stored message information is provided by one of the switches 108, 110 or 112 which are coupled to I/O port 224. The microcomputer 206 recovers the stored message information from RAM 212 and directs the information over the data bus 220 through I/O 228 to a display driver 236 which processes the message information and formats the information for presentation by a display 104, such as an LCD (liquid crystal display).

Battery saver operation is controlled by the CPU 222 with battery saving signals which are directed over the data bus 220 to the I/O port 224 which couples to a power switch 250. Power is periodically supplied to the receiver 204 by the power switch 250 to enable decoding of the received address and message information which is directed to the receiver. When required, a voltage converter is provided which steps up the voltage generated by a battery 254 to a higher level (VDD), such as when required for the operation of the microcomputer 206, and further, to a higher level (VEE), which is often, but not always, required to reconfigure, or reprogram the EEPROM 216. The information reprogrammed by the user, as will be described further below, can also be reprogrammed into the code memory 226 under the control of the microcomputer 206 using a programming means 258 which couples to the microcomputer 206 through I/O port 228. It will be appreciated that the programming means 258 can be implemented as an independent function, or may be integral with the code memory 226. A real time clock circuit 260, such as an MC68HC68T1 integrated circuit manufactured by Motorola, Inc. of Schaumburg, Ill. couples to the microcomputer 206, such as through I/O port 224, to provide such clock functions as time, date and alarm functions.

As described briefly above, the switches 108, 110 and 112 provide control of the communication receiver operation by the user. In prior art communication receivers, the switches have provided dedicated control functions, i.e. the functions provided by the switches 108, 110, or 112 were predefined, and could not be changed or altered by the user. In such a communication receiver utilizing a microcomputer, the switch control functions were predefined in state tables stored in the ROM 214 together with the receiver control subroutines. Because more than one function could be associated with any given switch, the switches were not generally identified by names, but rather by symbolic labels as shown in FIG. 1. This often led to the confusion by the user of which button, or sequence of buttons, should be selected to perform a particular receiver operating function, such as reading a stored message, clearing a read message, and the like.

Unlike the prior art communication receivers, in the communication receiver 100 in accordance with the preferred embodiment of the present invention, the various switch functions are more or less permanently user reconfigurable, that is, the switch control functions can be reconfigured by the user until such time as the switch functions may later be reconfigured by the user. It will be appreciated that some receiver control functions may not be subject to reconfiguration by the user, and in such instances, these functions are defined in state tables stored in the ROM 214, while those receiver control functions which can be reconfigured by the user are defined in state tables stored in the code memory 226, as will be described in further detail below.

Figure 3:
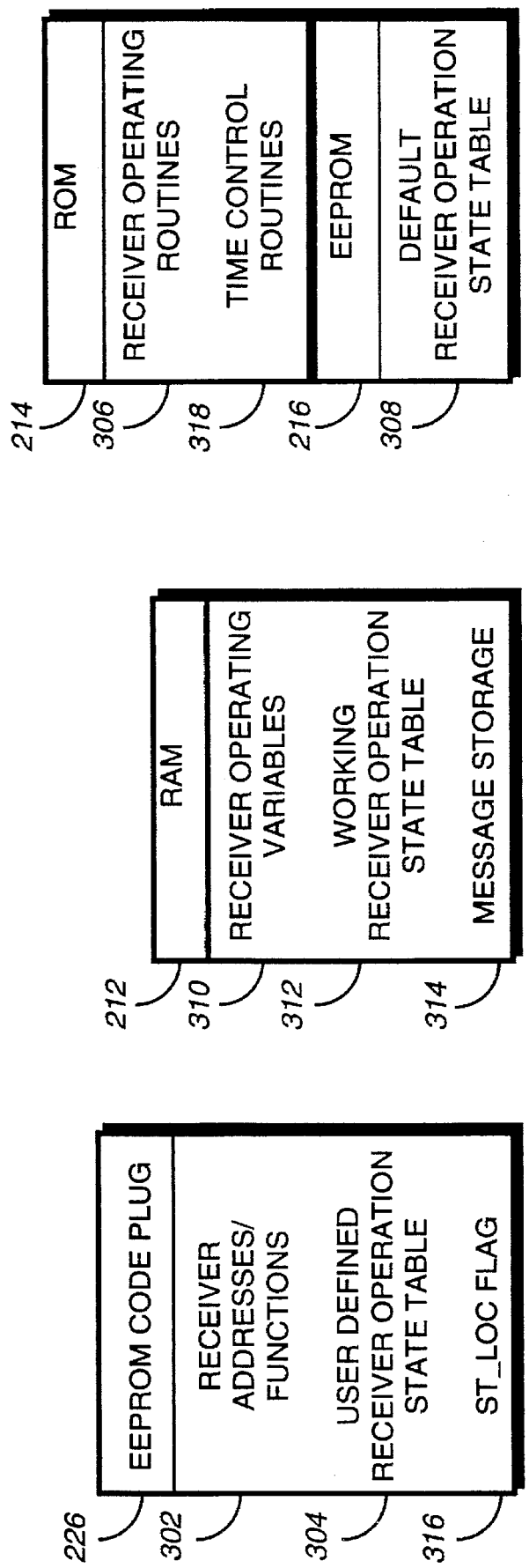
FIG. 3 is a memory map depicting representative firmware routines utilized by the communication receiver to provide user configurable control functions in accordance with the preferred embodiment of the present invention.

As described above, the actual operation of the communication receiver 100 is controlled by firmware routines. FIG. 3 is a memory map depicting representative firmware routines utilized by the communication receiver 100 to provide user configurable control functions in accordance with the preferred embodiment of the present invention. The code memory 226, preferably a EEPROM code memory, stores one or more addresses 302 assigned to the communication receiver 100. Also stored in the code memory 226 are the functions 302 associated with each of the addresses. The functions 302 define the type of message associated with a particular address, such as a tone only message, a numeric message, or an alphanumeric message. In addition, the functions 302 can define other attributes of the message, such as the message priority, and alert cadences associated with an address, etc. Also stored in the code memory 226 is a user defined receiver operation state table 304 which is initially undefined when the communication receiver 100 is procured by the user. Should the user desire to reconfigure the receiver control functions, information defining the switch functions is programmed into the user defined receiver operation state table 304, as will be described in further detail below. A state location flag (ST_LOC FLAG) 316 provides information designating when information is programmed into the user defined receiver operation state table 304.

As described above, the ROM 214 contains the receiver operating routines 306, such as a battery saving routine, an address decoding routine, message storage and retrieval routines, and a message display routine, just to name a few. Time control routines 318, such as for setting the time or date, or for setting alarm functions, are also stored in ROM 214. The EEPROM 216 contains the default receiver operation state table 308 which defines the switch functions provided when the communication receiver 100 is initially procured by the user. It will be appreciated that the EEPROM 216 can also store those switch functions used for controlling time, when such functions are user definable as well.

As described above, the RAM 212 is used to store receiver operating variables 310 which are generated by the central processing unit 222 as the various receiver operating routines are being run. The RAM 212 is also used to provide message storage 314, although it will be appreciated, that an additional external random access memory can also be utilized to provide increased message storage capability. After the communication receiver is turned on, the RAM is also used to store the working receiver operation state table 312 which defines the current switch functions.

When the communication receiver 100 is turned on, the information contained in the default receiver operation state table 308 is loaded into the RAM 212 which then becomes the working receiver operation state table. When the user has reconfigured one or more of the switch functions, the user defined receiver operation state table 304 is loaded into the RAM 212 which then becomes the working receiver operation state table. Selection of the default receiver operation state table 308 or the user defined receiver operation state table 304 is controlled by a state location flag bit (ST_LOC FLAG) 316 stored in the code memory 226 which is set at the time the user redefines any switch function, as will be described below.

While three state tables have been described above which are located in three different memory areas, it will be appreciated that the default receiver operation state table 308 and the user defined receiver operation state table 304 can be stored in a single memory area, such as in the code memory 226 or the EEPROM 216. Furthermore, it will be appreciated that while the working receiver operation state table is shown as being located in the RAM 212, it will also be appreciated that the appropriate default receiver operation state table 308 or the user defined receiver operation state table 304 can also be addressed by the central processing unit 222 directly from the code memory 226 or the EEPROM 216, when RAM 212 memory space is limited.

FIGS. 4 and 5 illustrate a receiver operation state table 400 depicting representative control function operations for the communication receiver providing user configurable switch functions in accordance with the preferred embodiment of the present invention. The receiver operation state table 400 defines various operational states 402 encountered during the operation of the communication receiver 100. The operational states 402 include such states as receiver off state (OFF), POWER UP state, STANDBY state, PAGE ALERT state, MEMORY READ state, MODE CHANGE state, receiver on to receiver off state (PAGER OFF), CLEAR MESSAGE state and when a real time clock is included in the communication receiver, SET TIME state. The receiver operation state table 400 also defines various functions 404 which are performed by the microcomputer 206. The functions 404 include address detection (PAGE DETECT), next function state (STATE TIME-OUT), predefined function time out periods (STATE TIME), operational display functions (DISPLAY ROUTINES), memory management functions (MEMORY ROUTINES), and switch 1, 2 and 3 operational definitions (SINGLE PUSH-DOUBLE PUSH-PUSH/HOLD). For each operational state 402 and function 404, there is a corresponding state table value, or entry, 408 which defines the actual operation to be performed by the central processing unit. In the preferred embodiment of the present invention, only those state table entries 408 enclosed within box 406 are subject to being changed by the user, thereby enabling the user to reconfigure the control functions provided by the switches. A complete description of each state table entry will not be provided herein, as it will be appreciated that one of ordinary skill in the art will understand the general meaning of each state table entry. As shown in FIGS. 4 and 5, the user can reconfigure the operation of switch 1 (108), switch 2 (110) and switch 3 (112) to define the operation to be performed by each of the switches. In addition, the user can specify the form of actuation of the switch required to perform the switch function, such as to perform the switch function when a single switch push occurs, when a double switch push occurs, or following a predetermined time period after which the switch is pushed and held.

It will be appreciated that the default receiver operation state table entries are generally a matter of design choice and depend upon the number of receiver operational states 402 defined, the number of functions 404 defined, and the desired activity which is to be performed by the central processing unit 222 for any combination of receiver operational states and functions.

Figure 6:
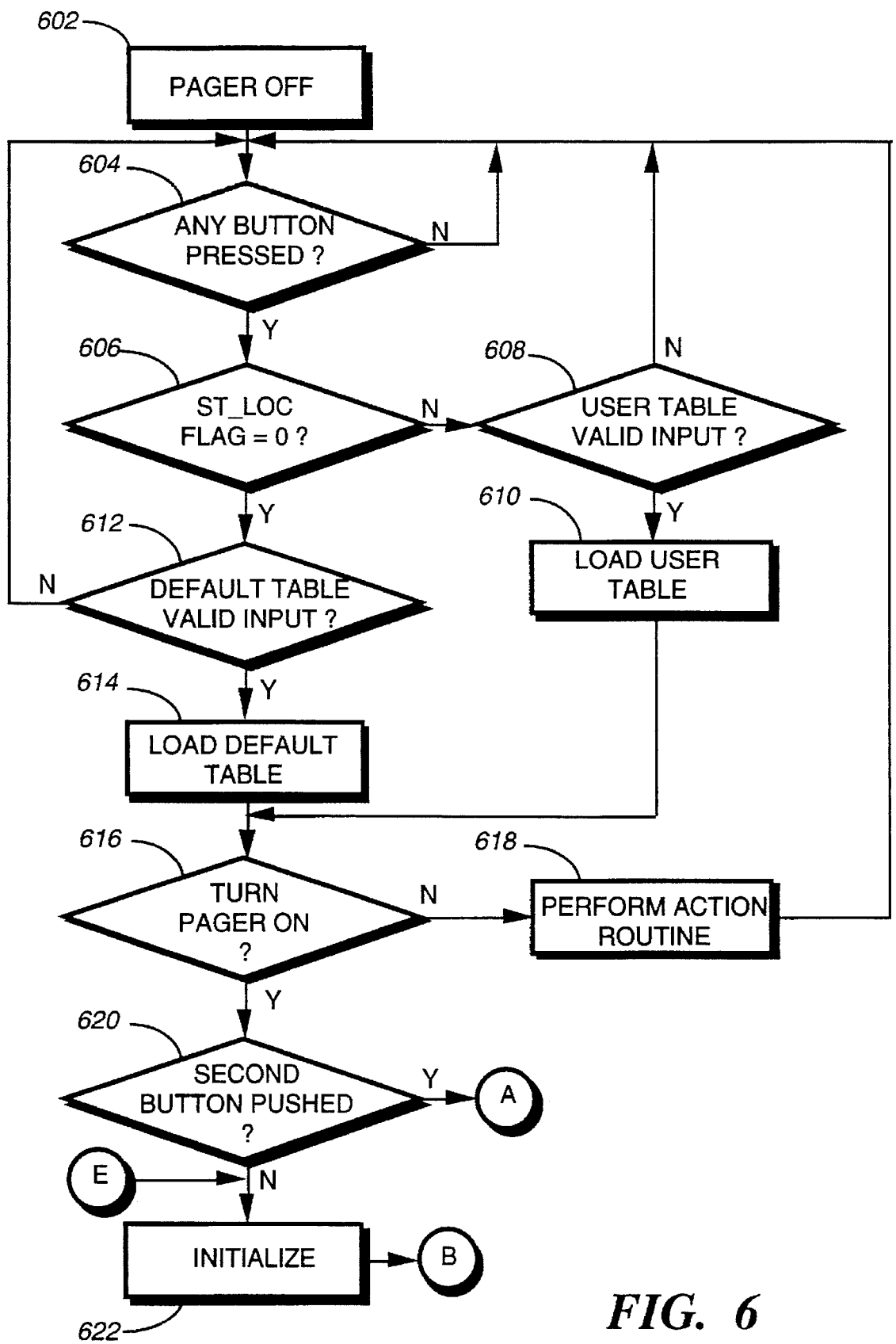
FIGS. 6–9 are flow charts illustrating the operation of the communication receiver to provide user configurable control functions in accordance with the preferred embodiment of the present invention.

FIGS. 6–9 are flow charts illustrating operation of the communication receiver providing user configurable control functions in accordance with the preferred embodiment of the present invention. Referring to FIG. 6, while the communication receiver is shown to be in the off state 602, other switch functions can be available, such as time related functions. As long as none of the switches are depressed 604, the communication receiver remains in the off state and no other functions are enabled. When the communication receiver is turned off, power to the microcomputer is also reduced, and reapplied periodically to allow the microcomputer to detect when any switch is depressed 604. When a switch activation is detected 604 during the periodic power up periods, the microcomputer checks 606 the value of the state location flag (ST_LOC flag) to determine from which receiver operation state table the switch function corresponding to the switch being activated is to be found. When the state location flag (ST_LOC flag) is determined 606 to be a logic zero, the microcomputer checks the default receiver operation state table to determine if the input is valid 612. When the switch activation is found to be invalid 612, i.e. not allowed by the default receiver operation state table, the microcomputer returns to the reduced power state to monitor for another switch activation. Likewise, when the state location flag (ST_LOC flag) is determined 606 not to be a logic zero, the microcomputer checks the user defined receiver operation state table to determine if the input is valid 608. When the switch activation is found to be invalid 608, i.e. not allowed by the user defined receiver operation state table, the microcomputer returns to the reduced power state to monitor for another switch activation. When the microcomputer determines the switch activation is valid 608, the user defined receiver operation state table is loaded 610 into RAM, and when the microcomputer determines the switch activation is valid 612, the default receiver operation state table is loaded 614 into RAM. The microcomputer then checks 616 whether the activated switch is intended to turn the communication receiver on. When the microcomputer determines 616 the switch activation does not turn on the communication receiver, the action routine corresponding to the switch activation is performed 618, such as setting the time, setting an alarm time, or resetting a time activated alarm. When the microcomputer determines 616 the switch activation does turn on the communication receiver, the microcomputer checks whether a second switch was simultaneously actuated 620 to determined whether a normal receiver turn on sequence is requested, or an alternate receiver turn on sequence is being requested, as will be described in detail below.

When a normal receiver turn on sequence request is detected, i.e. a second switch was not actuated 620, the microcomputer is initialized 622 for normal receiving operation, such as to be described in FIG. 9 below. When the alternate receiver turn on sequence request is detected 620, the program flow continues to that described in FIG. 7. In the preferred embodiment of the present invention, actuation of two switches in a predetermined sequence indicates the user requests to reconfigure one or more of the default switch functions. Reconfiguration of the switch functions begins by displaying 702 "Select Default Table" on the communication receiver display. It will be appreciated that when only a numeric display is provided, a numeric value can be utilized to indicate a request as to whether the default receiver operation state table is to be selected. In addition, when a multiple line alphanumeric display is available in the communication receiver, a second line displaying selected user responses, such as "S1/S2=NO -S3=YES" can be provided as well. When a second line is unavailable in an alphanumeric receiver, or the display provides only a numeric display as in a numeric receiver, it will be appreciated that the user responses can be predefined wherein a predefined switch selection, such as either switch S1 or S2 selects the "NO" response, and a selection of switch S3 selects the "YES" response. It will further be appreciated that when only a single line alphanumeric display is available, or only a numeric display is available, that any combination of switch responses can be predefined to provide "YES" and "NO" responses for the user. It will be assumed for purposes of description that at least a single line alphanumeric display as shown in FIG. 1 is provided on the communication receiver to provide user configurable control functions in accordance with the preferred embodiment of the present invention.

The display "Select Default Table" requests whether the user wants to reload the default receiver operation state table entries as the working receiver operation state table entries, such as might occur when the user forgets a user defined switch function programmed sequence, or to reconfigure the current working receiver operation state table entries. When the user activates 704 switch S3, indicating the user is requesting the default receiver operation state table be loaded, the state location flag (ST_LOC FLAG) is set 706 to a logic zero. The working receiver operation state table located in RAM is loaded 708 with the default receiver operation state table, and the user defined receiver operation state table is cleared 710, returning switch function operation of the receiver to that originally defined by the default receiver operation state table. The program flow then returns to step 622 wherein the microcomputer is initialized as described above.

In the preferred embodiment of the present invention, the user is able to define the switch functions for each receiver operating state such as described in FIGS. 4 and 5. When the user activates 704 either switch S1 or S2 when the default table is not selected, reconfiguration of the switch functions begins with the switch functions associated with the receiver off state 712 (OFF, FIG. 4). The message "Change (State Name) ?" is displayed, where (State Name) is the actual name of the state being changed. Thus, "Change OFF" is displayed to request whether the user wants to change the current receiver "OFF" state switch functions. When either switch S1 or S2 are actuated 716 indicating the user does not want to change the current receiver "OFF" state switch functions, the previous working receiver operation state table entries are checked to determine whether they remain valid 718, and program flow continues to step 826 shown in FIG. 8. When it is determined 718 the previous working receiver operation state table entries are not valid, the "OFF" state entries are set per the default receiver operation state table, and then program flow continues to step 826 shown in FIG. 8. When the user activates 716 switch S3 indicating the user wants to change the current receiver "OFF" state switch functions, the first allowable switch function for the "OFF" state is displayed 722. The message "OFF/ON 1 2 3 S D H" is displayed indicating the receiver "off to on" function can be defined for either switch 1, 2 or 3, and the switch actuation mode being activated with either a single (S), double (D), or push and hold (H) switch actuation. Switches S1, S2 and S3 are utilized to select the desired switch function as will be described in FIG. 8 below, but which can be summarized briefly as follows: switch S1 enables the user to scroll a cursor right through the menu, switch S2 allows the user to select the switch to be used, and switch S3 allows the user to exit the current selection. The cursor identifying the entry selection is indicated by either blinking the selected displayed digit, such as either the "1", "2", "3", "S", "D", or "H", or by providing an underscore beneath the selected displayed digit. Program flow then continues to step 802 shown in FIG. 8.

Figure 7:
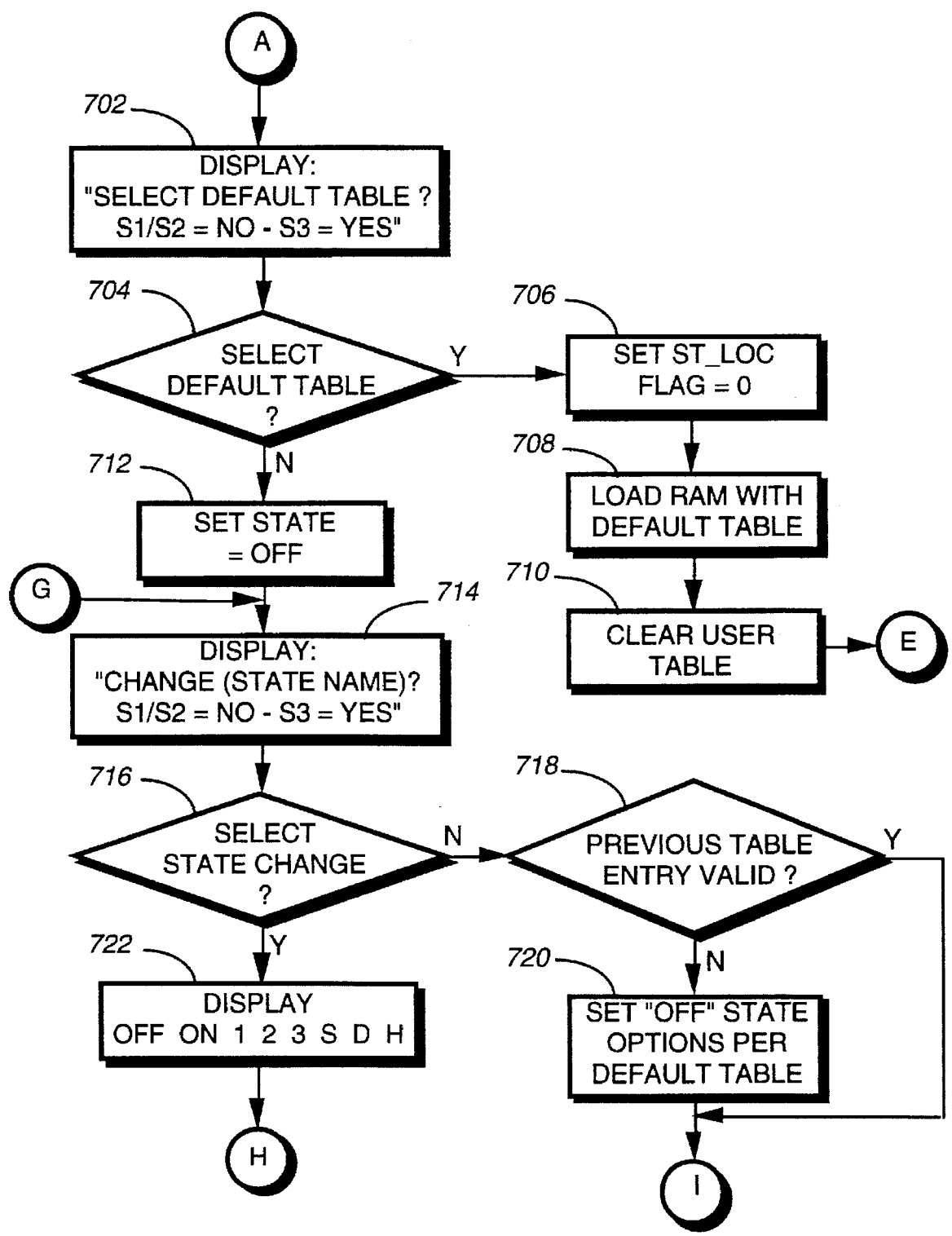
Figure 8:
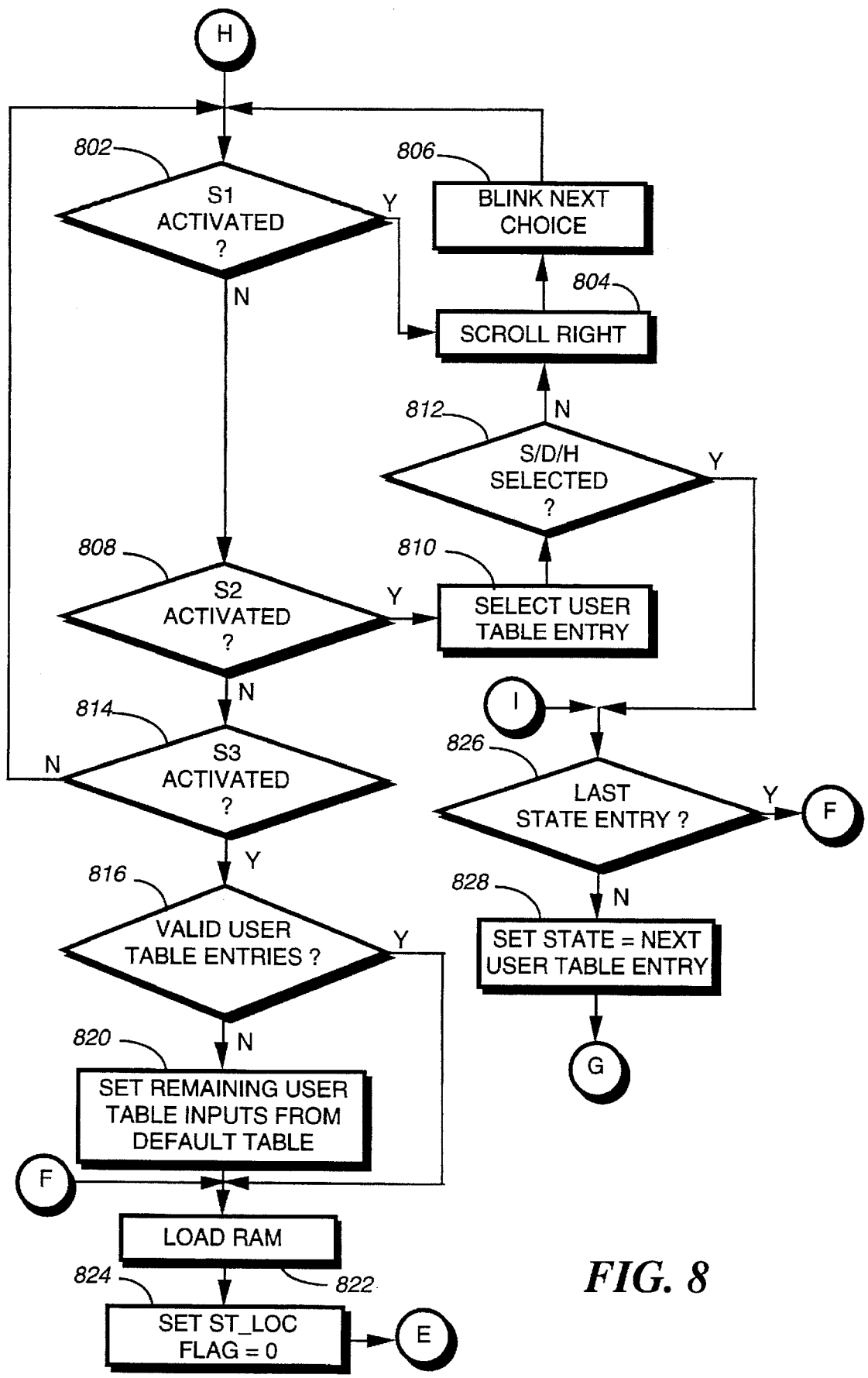

Referring to FIG. 8, when switch S1 is actuated 802 a cursor is scrolled right 804 through the available choices, which for the example shown in step 722 of FIG. 7 is either the "1", "2", "3", "S", "D"or "H", with the displayed digit indicating the next choice being blinked 806, or in the alternative underscored as described above. It will be appreciated that for each switch function selection, there are two choices, a choice of switch and a choice of the switch operation mode. When the user first scrolls 804 through the menu presented, the switch selection is highlighted (e.g. blinked or underlined) at step 806. Program flow then returns to step 802, at which time when switch S1 is not activated 802 and switch S2 is activated 808, programming of the selected entry into the user receiver operation state table 810 is enabled. Following the programming 810 of the table entry, a check is made 812 as to whether the switch actuation mode "S", "D" or "H" was selected, and if not, the cursor scrolls to the right 804, the next choice is highlighted 806 (e.g. blinking or underlined), after which the program flow returns to step 802. When the desired switch actuation mode is selected, actuation 808 of switch S2 enables programming the selected entry into the user receiver operation state table 810. When the switch actuation mode "S", "D" or "H" has been detected 812 as being programmed, program flow continues to step 826, which determines whether the last state table entry has been provided. When the last state table entry is made 826, program flow continues to step 822 to be described below. When the last state table entry is not made 826, the operating state is set for the next user state table entry 828, and program flow returns to step 714 of FIG. 7. Steps 714 through 722 are repeated as described above, however the switch function displayed at step 722 is changed to correspond to the next reconfigurable switch function. In the "OFF" state after reconfiguring of "OFF/ ON" switch function, the next reconfigurable switch function is "LIGHT" as shown in FIG. 4. Consequently message 722 would display "LIGHT 1 2 3 S D H", and so forth for all reconfigurable switch functions for the various receiver operating states.

Returning to FIG. 8, when switch S3 is activated 814, the user state table entries are checked to determine that valid entries have been provided for all receiver operating states 816. Should any entries be omitted by the user, the remaining state table entries are defined by the default receiver operation state table 820, and then the user defined receiver operation state table is loaded into RAM 822, otherwise, when all state table entries have been entered with valid entries 816, the user defined receiver operation state table is loaded into RAM 822. The state location flag (ST_LOC FLAG) is then set 824 to a logic zero, and program flow continues to step 622 of FIG. 6, as was described above.

To summarize the flow charts of FIGS. 6–8, the flow chart of FIG. 6 described the selection of either the default receiver operating state table or the user defined receiver operating state as the working receiver operating state table, and the switch actuation sequence required to enter the user defined switch reconfiguration mode. FIGS. 7 and 8 then described the procedure by which the user can reconfigure the various switch functions using a user friendly reconfiguration sequence. After the working receiver operation state table has been selected at step 620 of FIG. 6, or step 824 of FIG. 8, the microcomputer is initialized 622 of FIG. 6 as described above. Program flow then continues to step 902 of FIG. 9.

Figure 9:
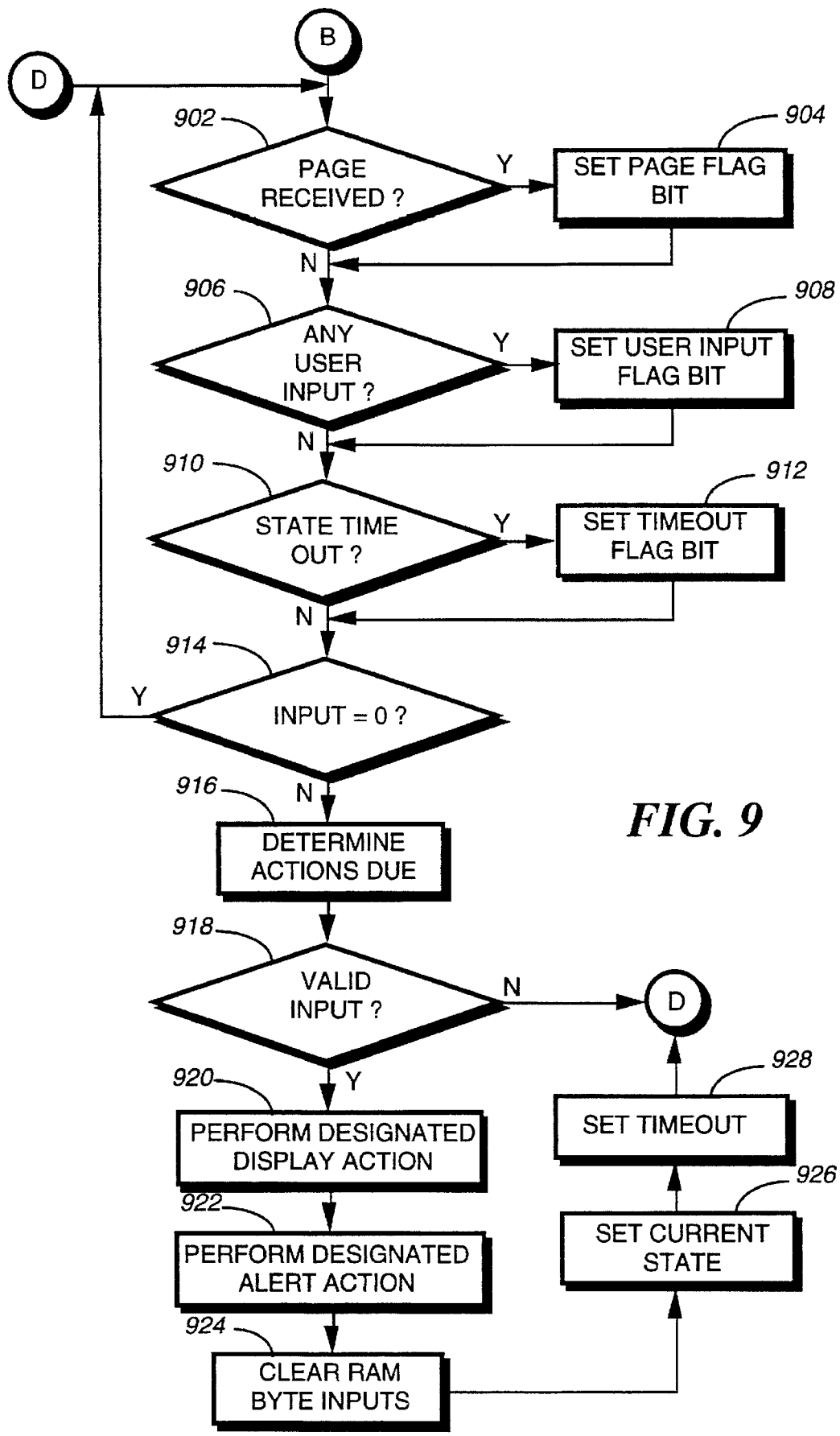

Referring to FIG. 9, after the working receiver operation state table has been loaded into RAM, normal operation of the communication receiver starts. Power is periodically supplied to the receiver during the well known battery saving periods depending on the signaling format implemented in order to enable the reception of a message, or page. When a page is received 902, a page flag bit is set 904 by the microcomputer and stored in a designated RAM location, and program flow continues to step 906. When a page has not been received 902, or a page has been received 902 and the page flag bit set 904, any user input 906 provided through the switches sets a user input flag bit 908 according to the switch selected and stored in a designated RAM location. When a page has not been received 902, nor user input is detected 906, or a user input is detected and the user flag bit has been set 908, the program flow continues to step 910. The microcomputer determines whether a state time-out 910 is required for the current operating state, and if so, a time out flag bit is set 912 and stored in a designated RAM location. When no page is received 902, no switch activation is detected 906, no state time out is detected 910, and the input flag is set to a logic zero 914, the process flow returns to step 902. When no page is received 902, no switch activation is detected 906, no state time out is detected 910, and the input flag is set to a logic one 914, which indicates that the page flag bit is set 904, a switch flag bit is set 908, or a time-out flag bit is set 912. The action corresponding to the type of input is then determined 916. Typical actions include receiving and storing the message after the page flag bit is set, retrieving and displaying the message after the switch flag bit is set corresponding to a request to read the message, or canceling an alert indicating to the user that a message has been received, after the time-out flag bit is set. Should multiple inputs, such as at steps 902, 906 or 910 be simultaneously received, the inputs are ordered as to priority, with page reception 902 being the highest priority and a state time out 910 being the lowest priority. When an input is detected 914, and an action is determined 916, the input is checked to determine if the input is valid 918 for the set of conditions currently encountered in the communication receiver. When the input is determined to be invalid 918, such as a switch actuation requesting resetting of the alert when the alert is not activated, the program flow returns to step 902. When multiple inputs are received and the highest priority input is determined 918 to be invalid, the program flow returns to step 902. After returning to step 902, should multiple inputs still be detected 914, the input having the lower priority is selected 916 and program flow continues as described above.

When the input is determined to be valid 918, i.e. corresponds to a state table entry in the working state table, a designated display action is performed 920 corresponding to the input received, such as displaying "SOURCE 1" when a message has been received on the first address assigned to the communication receiver. A designated alert action is also performed 922, such as alerting the user the page has been received, and the RAM byte inputs are then cleared 924. The current operating state is then set 926 corresponding to the next operating state following the operating state from which an operation, such as a switch actuation occurred, and when a time is associated with the current operating state, the time-out period is set 928, and the program flow then returns to step 902 to await the next input.

A communication receiver which provides user configurable control functions in accordance with the preferred embodiment of the present invention has been described above. When initially procured by the communication receiver user, a default set of receiver operation control functions are enabled to enable control of the communication receiver. Should the communication receiver user be dissatisfied with which receiver functions are being controlled by which receiver control switches, the user can redefine the receiver control functions associated with any, or all of the receiver control switches as described above. In this manner, a set of receiver control functions can be defined by the user which are more intuitively obvious to the user. Should the user, after having redefined one or more switch control functions wish to redefine the switch control functions, the switch control functions can be redefined as often as desired by the user. Should the user forget what functions were defined, the default set of receiver control functions can be easily reinstalled, or a new set of receiver control functions can be defined by the user.

We claim:

1. A communication receiver for receiving messages comprising:

at least one control;

a controller which provides control of at least first and second operating states of the communication receiver in response to a corresponding at least first and second operation of said at least one control by a user;

a memory for storing a first control function table defining an order by which a set of predetermined control functions is executed by said controller to control the at least first and second operating states of the communication receiver; and reconfiguration means, coupled to said memory and to said at least one control, for enabling the user to manually reconfigure the order by which at least a portion of the set of predetermined control functions is executed by said controller in response to the corresponding at least first and second operations of said at least one control by the user to enable control of one or more different operating states of the communication receiver, the order by which the at least a portion of the set of predetermined control functions is executed by said controller is stored in said memory within a second control function table, wherein said controller is responsive to said second control function table when stored to provide control of the one or more different operating states of the communication receiver by the user.

2. The communication receiver according to claim, 1, wherein said memory comprises a first memory portion comprising a read only memory, and a second memory portion comprising an electrically re-programmable read-only memory.

3. A communication receiver for receiving messages comprising:

a plurality of controls, one or more of said plurality of controls each enabling a user to control different first and second operating states of the communication receiver;

a controller which provides control of the different first and second operating states of the communication receiver in response to corresponding first and second operations of each of said one or more of said plurality of controls;

a first memory which stores a first information table defining a first order by which a set of predetermined control functions is executed by said controller to control the different first and second operating states of the communication receiver; and a second memory for storing a second information table defining a second order by which a set of predetermined control functions is executed by said controller to control different first and second operating states of the communication receiver, the second order by which the set of predetermined control functions is executed by said controller is defined and manually reconfigurable by the user by using one or more of said plurality of controls, wherein said controller is responsive to said second information table, to provide control of the different first and second operating states of the communication receiver in response to the corresponding first and second operations of each of said one or more of said plurality of controls when said second information table is stored.

4. The communication receiver according to claim 3, wherein said second memory further stores designating information designating when said second information table is manually reconfigured by the user, and wherein said controller is responsive to said designating information to control the different first and second operating states of the communication receiver in accordance with said second information table.

5. The communication receiver according to claim 3, wherein said first memory comprises a read-only memory.

6. The communication receiver according to claim 3, wherein said second memory comprises an electrically re-programmable read-only memory.

7. The communication receiver according to claim 3 wherein said controller further comprises enabling means, responsive to said plurality of controls, for enabling the user to store user defined control functions into said second information table.

8. The communication receiver according to claim 7 wherein said enabling means further enables the user to manually reconfigure said user defined control functions stored in said second information table, thereby redefining the user defined control functions provided by said one or more of said plurality of controls.

9. The communication receiver according to claim 8, wherein said controller further includes deleting means, coupled to said plurality of controls, for deleting said user defined control functions stored in said second information table.

10. The communication receiver according to claim 9, wherein said user defined control functions are deleted by said deleting means in response to a predetermined actuation sequence of two or more said plurality of controls.

11. A communication receiver for receiving messages comprising:

a plurality of controls, one or more of said plurality of controls each enabling a user to control different first and second operating states of the communication receiver;

a controller which provides control of the different first and second operating states of the communication receiver in response to corresponding first and second operations of each of said one or more of said plurality of controls;

a first memory for storing a first information table defining a first order by which a set of predetermined control functions is executed by said controller to control the different first and second operating states of the communication receiver; and a second memory for storing a second information table defining a second order by which a set of predetermined control functions is executed by said controller to control different first and second operating states of the communication receiver, the second order by which the set of predetermined control functions is executed by said controller is defined and manually reconfigurable by the user by using one or more of said plurality of controls, said second memory further storing designating information designating when said second information table is reconfigured by the user, wherein said controller is responsive to the designating information to provide control of the different first and second operating states of the communication receiver in accordance with said second information table.

12. The communication receiver according to claim 11, wherein said first memory comprises a read-only memory.

13. The communication receiver according to claim 11, wherein said second memory comprises an electrically re-programmable read-only memory.

14. The communication receiver according to claim 11 wherein said controller further comprises enabling means, responsive to said plurality of controls, for enabling the user to store user defined control functions into said second information table.

15. The communication receiver according to claim 14 wherein said enabling means further enables the user to manually reconfigure said user defined control functions using one or more of said plurality of controls, thereby redefining the user defined control functions provided by one or more of said plurality of controls.

16. The communication receiver according to claim 15, wherein said controller further includes deleting means coupled to said plurality of controls, for deleting said user defined control functions stored in said second information table.

17. The communication receiver according to claim 16, wherein said user defined control functions are deleted by said deleting means in response to a predetermined actuation sequence of two or more of said plurality of controls.

18. A communication receiver for receiving messages comprising:

a plurality of controls, one or more of said plurality of controls each enabling a user to control different first and second operating states of the communication receiver;

a controller, responsive to receiver control information, to provide control of the different first and second operating states of the communication receiver in response to corresponding first and second operations of each of said one or more of said plurality of controls;

a first memory for storing a first information table defining a first order by which a set of predetermined control functions is executed by said controller;

a second memory for storing a second information table defining a second order by which a set of predetermined control functions is executed by said controller to control different first and second operating states of the communication receiver, the second order by which the set of predetermined control functions is executed by said controller is defined and manually reconfigurable by the user by using one or more of said plurality of controls;

a memory which stores designating information designating when said second information table is manually reconfigured by the user; and a third memory for storing receiver control information which is executed by said controller to control the different first and second operating states of the communication receiver, wherein said controller controls storing said first information table as the receiver control information within said third memory when said designating information is not stored, and further controls storing said second information table as the receiver control information within said third memory when said designating information is stored.

19. The communication receiver according to claim 18, wherein said first memory comprises a read-only memory.

20. The communication receiver according to claim 18, wherein said second memory comprises an electrically re-programmable read-only memory.

21. The communication receiver according to claim 18, wherein said third memory comprises a read-only memory.

22. The communication receiver according to claim 18 wherein said controller further comprises enabling means, responsive to said plurality of controls, for enabling the user to store user defined control functions into said second information table.

23. The communication receiver according to claim 22 wherein said enabling means further enables the user to manually reconfigure said user defined control functions, thereby redefining the user defined control functions provided by one or more of said plurality of controls.

24. The communication receiver according to claim 23, wherein said controller further includes deleting means, coupled to said plurality of controls, for deleting said user defined control functions stored in said second information table.

25. The communication receiver according to claim 24, wherein said user defined control functions are deleted by said deleting means in response to a predetermined actuation sequence of two or more of said plurality of controls.

* * * * *